(12) United States Patent
Tseng (10) Patent No.: US 10,755,632 B2
(45) Date of Patent: Aug. 25, 2020

(54) EYE TRACKING-BASED DISPLAY CONTROL SYSTEM

(71) Applicant: Wistron Corporation, New Taipei (TW)

(72) Inventor: Tien-Chung Tseng, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/046,761

(22) Filed: Jul. 26, 2018

(65) Prior Publication Data
US 2019/0355298 A1    Nov. 21, 2019

(30) Foreign Application Priority Data
May 18, 2018    (TW) .............................. 107117040 A (51) Int. Cl.
*G09G 3/3225*    (2016.01)
*G06F 3/01*    (2006.01)
*G09G 3/36*    (2006.01)
*B60R 1/04*    (2006.01)
*B60R 1/08*    (2006.01)
*B60R 11/00*    (2006.01)
*B60R 11/04*    (2006.01)

(52) U.S. Cl.
CPC ............. *G09G 3/3225* (2013.01); *B60R 1/04* (2013.01); *B60R 1/088* (2013.01); *B60R 11/00* (2013.01); *B60R 11/04* (2013.01); *G06F 3/013* (2013.01); *G09G 3/3648* (2013.01); *B60R 2011/0033* (2013.01); *G09G 2354/00* (2013.01); *G09G 2360/144* (2013.01); *G09G 2380/10* (2013.01)

(58) Field of Classification Search
CPC ............... G09G 3/3225; G09G 3/3648; G09G 2360/144; G09G 2354/00; G09G 2380/10; G06F 3/013; B60R 1/04; B60R 1/088; B60R 11/00; B60R 11/04; B60R 2011/0033
See application file for complete search history.

(56) References Cited

U.S. PATENT DOCUMENTS 4,874,938 A * 10/1989 Chuang .................. B60J 3/0208
250/203.4
5,298,732 A *  3/1994 Chen ..................... G01S 3/7864
250/203.4

(Continued)

*Primary Examiner* — Amy Onyekaba
(74) *Attorney, Agent, or Firm* — Donald E. Stout; Stout, Uxa & Buyan, LLP (57) ABSTRACT

An eye tracking-based display control system includes a main body accommodating a mirror; a first image capture device disposed on the main body and facing a first direction to capture a first image; a controller receiving and processing the first image; and a transparency controllable film disposed on an opposite side of the mirror against the main body. In response to a determination that a light source on the first image has brightness higher than a predetermined threshold, and a determination that a shift distance of eyes between an eye position and an initial position of a driver is not zero, the controller calibrates an original position of the light source according to the shift distance of the eyes and an initial coordinate system, thereby obtaining a calibrated position, according to which transparency of a local region of the transparency controllable film corresponding to the light source is changed.

9 Claims, 9 Drawing Sheets

(56) References Cited

U.S. PATENT DOCUMENTS

| | | | | |
|---|---|---|---|---|
| 5,305,012 A * | 4/1994 | Faris | A61F 9/023 | 345/7 |
| 5,322,996 A * | 6/1994 | Black | B60R 1/088 | 250/214 AL |
| 6,196,689 B1 * | 3/2001 | Brown | B60R 1/007 | 359/850 |
| 6,439,638 B1 * | 8/2002 | Kawasaki | B60J 3/0204 | 296/97.2 |
| 6,483,090 B1 * | 11/2002 | Bae | A61F 9/067 | 2/8.8 |
| 6,715,894 B1 * | 4/2004 | Taylor | B60R 1/10 | 359/854 |
| 7,505,136 B2 | 3/2009 | Romig | B64C 1/1484 | 250/221 |
| 7,970,172 B1 * | 6/2011 | Hendrickson | B60J 3/04 | 280/735 |
| 9,702,183 B1 | 7/2017 | Ochiai | E06B 9/24 | |
| 9,911,395 B1 | 3/2018 | Townsend | G09G 5/10 | |
| 10,319,272 B1 | 6/2019 | Carter | G06F 3/013 | |
| 2003/0169213 A1 * | 9/2003 | Spero | G02B 5/20 | 345/7 |
| 2006/0006988 A1 * | 1/2006 | Harter, Jr. | B60Q 9/008 | 340/435 |
| 2006/0175859 A1 * | 8/2006 | Isaac | B60J 3/04 | 296/97.4 |
| 2008/0084499 A1 * | 4/2008 | Kisacanin | G06K 9/2027 | 348/370 |
| 2009/0168185 A1 * | 7/2009 | Augustine | B60J 3/04 | 359/613 |
| 2012/0033285 A1 * | 2/2012 | Baumann | B60R 1/088 | 359/267 |
| 2012/0069446 A1 * | 3/2012 | Kinoshita | G02B 27/01 | 359/630 |
| 2012/0140308 A1 * | 6/2012 | Cordova | B60J 3/04 | 359/244 |
| 2013/0038956 A1 * | 2/2013 | Matsumoto | B60R 1/006 | 359/857 |
| 2013/0048835 A1 * | 2/2013 | Drummond | B60R 1/088 | 250/208.2 |
| 2013/0300911 A1 * | 11/2013 | Beckman | G02B 27/0101 | 348/335 |
| 2014/0320946 A1 * | 10/2014 | Tomkins | B60J 3/04 | 359/275 |
| 2015/0077826 A1 * | 3/2015 | Beckman | G02B 27/01 | 359/238 |
| 2015/0273989 A1 * | 10/2015 | Momot | B60J 3/04 | 701/36 |
| 2016/0018889 A1 * | 1/2016 | Skogo | H04N 5/23219 | 348/78 |
| 2016/0185191 A1 * | 6/2016 | Kankaya | B60J 3/026 | 701/49 |
| 2016/0216514 A1 * | 7/2016 | Hue | G02B 27/017 | |
| 2016/0229268 A1 * | 8/2016 | Fleury | B60J 3/04 | |
| 2016/0253971 A1 * | 9/2016 | Shepard | G06K 9/00268 | 345/667 |
| 2016/0349542 A1 * | 12/2016 | Wilenski | G02F 1/19 | |
| 2016/0357014 A1 * | 12/2016 | Beckman | G02B 27/01 | |
| 2017/0001553 A1 * | 1/2017 | Hue | H05B 47/105 | |
| 2017/0050542 A1 * | 2/2017 | Shigeta | G02B 27/0149 | |
| 2017/0059896 A1 * | 3/2017 | Iwata | G02F 1/137 | |
| 2017/0072774 A1 * | 3/2017 | Kim | B60J 3/0208 | |
| 2017/0131765 A1 * | 5/2017 | Perek | G06T 7/74 | |
| 2017/0206858 A1 * | 7/2017 | Wu | G09G 5/10 | |
| 2017/0220106 A1 * | 8/2017 | Tomiyama | B60J 1/02 | |
| 2017/0227791 A1 * | 8/2017 | von und zu Liechtenstein | G01J 4/00 | |
| 2017/0302914 A1 * | 10/2017 | Tonar | H04N 13/366 | |
| 2018/0017791 A1 * | 1/2018 | Beckman | H04N 5/23287 | |
| 2018/0024359 A1 * | 1/2018 | Yoneyama | G09G 5/377 | 345/9 |
| 2018/0039846 A1 * | 2/2018 | Grubb | G06K 9/00845 | |
| 2018/0086346 A1 * | 3/2018 | Fujisawa | B62D 15/029 | |
| 2018/0111451 A1 * | 4/2018 | Martens | B60J 3/04 | |
| 2018/0126907 A1 * | 5/2018 | Jeromin | B60R 1/088 | |
| 2018/0129050 A1 * | 5/2018 | Hayashi | H04N 9/3194 | |
| 2018/0151154 A1 * | 5/2018 | Lee | G09G 5/10 | |
| 2018/0178729 A1 * | 6/2018 | Festerling, Jr. | G06K 9/00832 | |
| 2018/0186214 A1 * | 7/2018 | Chundrlik, Jr. | B60R 1/04 | |
| 2018/0373033 A1 * | 12/2018 | Oshima | B60K 35/00 | |
| 2019/0126821 A1 * | 5/2019 | Ho | G06F 3/04842 | |
| 2019/0156150 A1 * | 5/2019 | Krishnan | A61B 3/113 | |
| 2019/0168586 A1 * | 6/2019 | Paepcke | B60J 3/04 | |

* cited by examiner

EYE TRACKING-BASED DISPLAY CONTROL SYSTEM

CROSS-REFERENCE TO RELATED APPLICATIONS

This application claims priority of Taiwan Patent Application No. 107117040, filed on May 18, 2018, the entire contents of which are herein expressly incorporated by reference.

BACKGROUND OF THE INVENTION

1. Field of the Invention

The present disclosure generally relates to a display system, and more particularly to an eye tracking-based display control system.

2. Description of Related Art

A rearview mirror of a vehicle is an indispensable device, usually affixed to the top of a front windshield, designed to allow a driver to see rearward through a rear windshield. When the sun shines at a small angle (e.g., at dawn or dusk) or a lamp of a same-direction rear vehicle emits bright light, glare may be commonly generated on the rearview mirror to affect driver's vision and safe driving. Similarly, when the sun shines at a small angle or a lamp of an opposite-direction front vehicle emits bright light, the bright light passing the front windshield may affect driver's vision and safe driving.

In order to prevent glare or bright light, one or more layers of special material may be coated on the rearview mirror or the front windshield. However, the coated layer or layers may disadvantageously reduce transparency of the rearview mirror or the front windshield.

A head-up display (HUD) was initially developed for military aviation, and is now disposed on a front windshield of automobiles in coordination with global positioning system (GPS) to navigate a driver. However, the driver may perceive an offset or misaligned navigation image toward a wrong direction by the head of driver moving, thus resulting in unsafe driving.

A need has thus arisen to propose a novel scheme adaptable to the rearview mirror, the front windshield or the head-up display to reduce glare, bright light or to provide proper navigation.

SUMMARY OF THE INVENTION

According to one embodiment, an eye tracking-based display control system includes a main body, a first image capture device, a controller and a transparency controllable film. The main body defines a space to accommodate a mirror. The first image capture device is disposed on the main body and faces a first direction to capture a first image. The controller is electrically connected to the first image capture device to receive and process the first image. The transparency controllable film is disposed on an opposite side of the mirror against the main body. In response to a determination that a light source on the first image has brightness higher than a predetermined first threshold, and a determination that a shift distance of eyes between an eye position and an initial position of a driver is not zero, the controller calibrates an original position of the light source according to the shift distance of the eyes and an initial coordinate system, thereby obtaining a calibrated position, according to which transparency of a local region of the transparency controllable film corresponding to the light source is changed.

According to another embodiment, an eye tracking-based display control system includes a main body, a first image capture device, a second image capture device, a controller and a transparency controllable film. The main body defines a space to accommodate a mirror. The first image capture device is disposed on the main body and faces a first direction to capture a first image; and the second image capture device is disposed on the main body and faces a second direction to capture a second image, the second direction being different from the first direction. The controller is electrically connected to the first image capture device and the second image capture device to respectively receive and process the first image and the second image. The transparency controllable film is attached to an inner side of a front windshield or disposed between the front windshield and a steering wheel. In response to a determination that a light source on the second image has brightness higher than a predetermined second threshold, and a determination that a shift distance of eyes between an eye position and an initial position of a driver is not zero, the controller calibrates an original position of the light source according to the shift distance of the eyes and an initial coordinate system, thereby obtaining a calibrated position, according to which transparency of a local region of the transparency controllable film corresponding to the light source is changed.

According to a further embodiment, an eye tracking-based display control system includes a main body, a first image capture device, a controller, a transparency controllable film, a digital map database and a navigation unit. The main body defines a space to accommodate a mirror. The first image capture device is disposed on the main body and faces a first direction to capture a first image. The controller is electrically connected to the first image capture device to receive and process the first image. The transparency controllable film is attached to an inner side of a front windshield or disposed between the front windshield and a steering wheel. The digital map database provides a digital map, and the navigation unit provides position information. The controller displays a navigation image on the transparency controllable film according to the digital map and the position information. In response to a determination that a shift distance of eyes between an eye position and an initial position of a driver is not zero, the controller calibrates an original position of the navigation image according to the shift distance of the eyes and an initial coordinate system, thereby obtaining a calibrated position, according to which the navigation image is displayed on the transparency controllable film.

DETAILED DESCRIPTION OF THE INVENTION

Figure 1A:
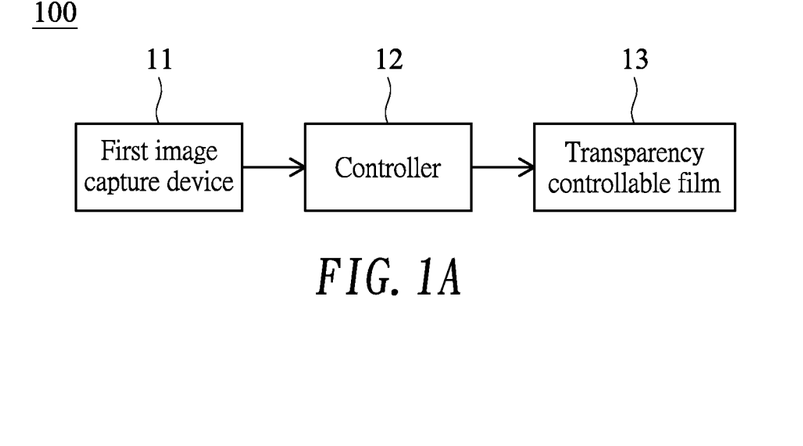
FIG. 1A shows a system block diagram illustrating an eye tracking-based display control system according to a first embodiment of the present disclosure.

FIG. 1A shows a system block diagram illustrating an eye tracking-based display control system 100 according to a first embodiment of the present disclosure. The eye tracking-based display control system 100 ("display control system" hereinafter) of the embodiment may be adaptable to a rearview mirror of a vehicle (e.g., an automobile) to reduce glare.

Figure 2A:
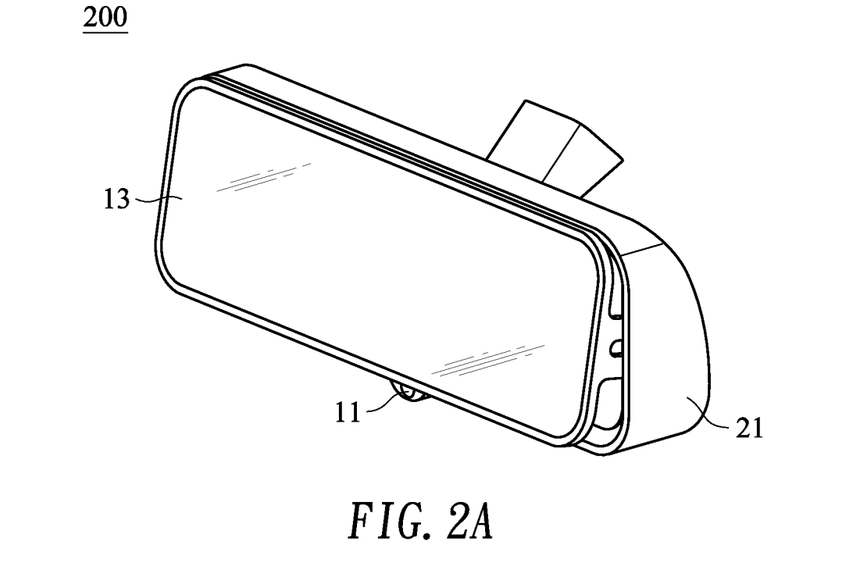
FIG. 2A to FIG. 2E show a perspective view, a side view, a front view, a rear view and an exploded view of a rearview mirror, respectively.
Figure 2B:
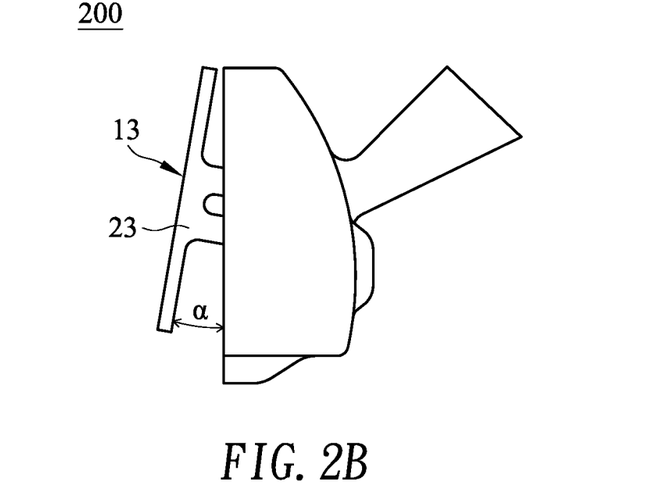
Figure 2C:
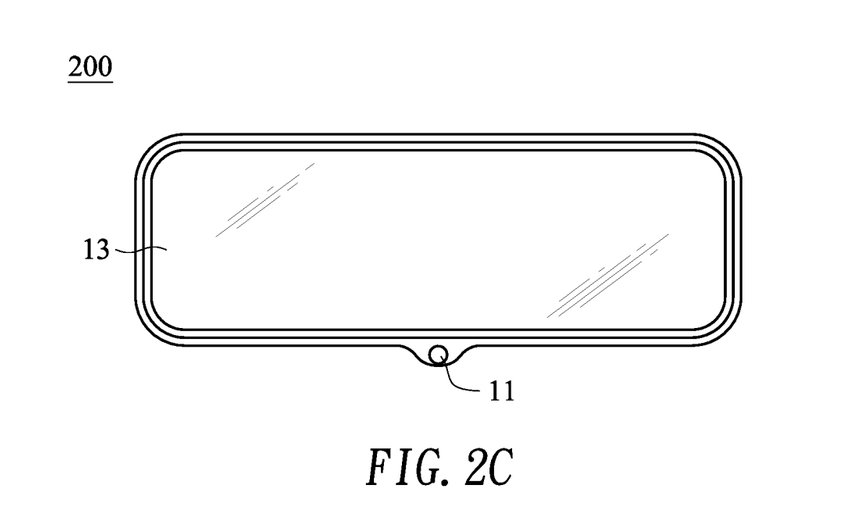

In the embodiment, the display control system 100 may include a first image capture device 11, such as a camera, that faces a first direction to capture a first image. In the embodiment, the first image capture device 11 faces rearward (e.g., toward a rear windshield) to capture a rear image. FIG. 2A to FIG. 2E show a perspective view, a side view, a front view, a rear view and an exploded view of a rearview mirror 200, respectively. The rearview mirror 200 may primarily include a main body 21 (e.g., a housing) and a mirror 22. Specifically, the main body 21 defines a space to accommodate the mirror 22. As shown in FIG. 2A or FIG. 2C, the first image capture device 11 is disposed on the main body 21, for example but not limited to, a bottom thereof.

The display control system 100 of the embodiment may include a controller 12, such as a digital image processor, that is electrically connected to the first image capture device 11 to receive and process the first image captured by the first image capture device 11. In the specification, if two devices are electrically connected, they may be connected in a wired manner or wirelessly. The controller 12 of the embodiment may, but not necessarily, be disposed in the space defined by the main body 21.

Figure 2D:
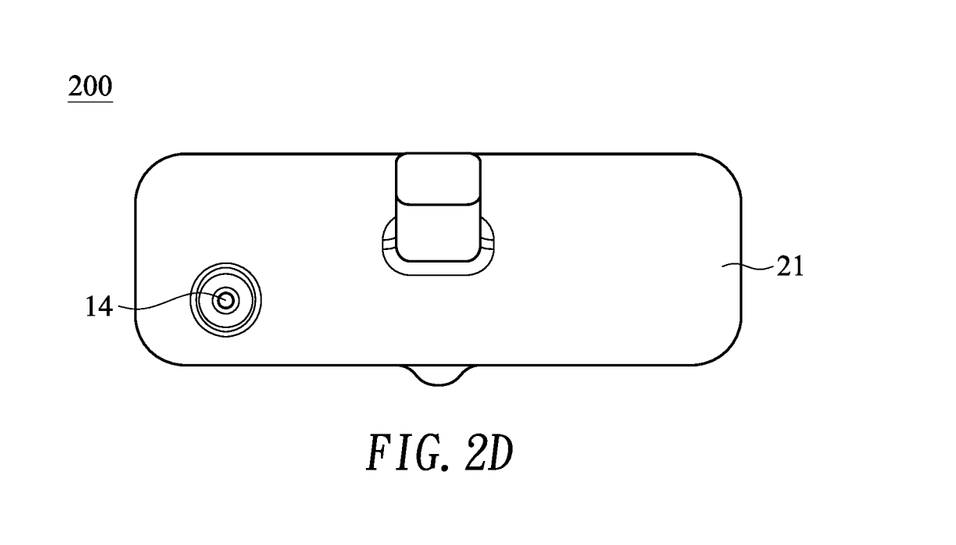
Figure 2E:
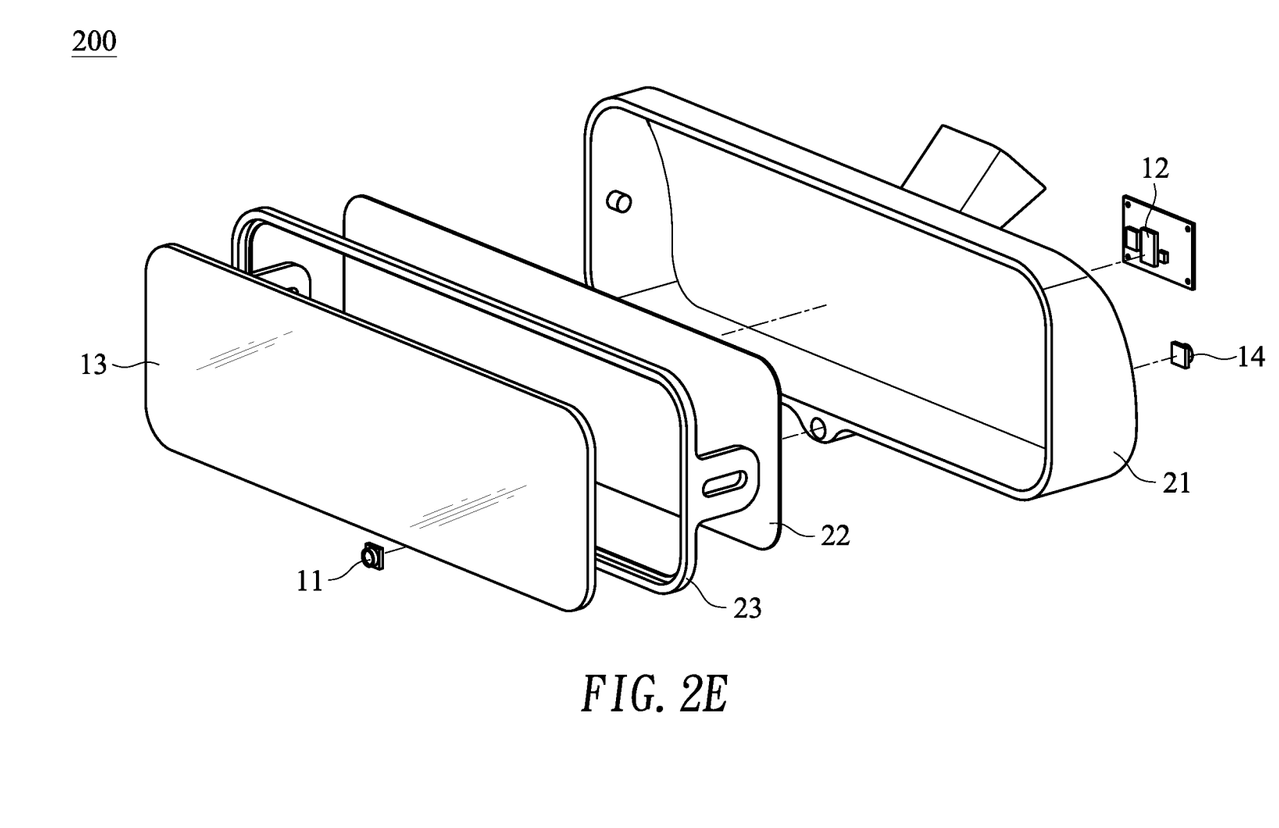

According to one aspect of the embodiment, the display control system 100 may include a transparency controllable film 13 disposed on an opposite side of the mirror 22 against the main body 21 as shown in FIG. 2E. The transparency controllable film 13 may be fixed to a holder 23, which may further be coupled to the main body 21. The sizes of the transparency controllable film 13 and the mirror 22 need not be the same, and they may be partially overlapped. In the embodiment, the holder 23 may be rotatable about the main body 21 such that there is an angle α between the transparency controllable film 13 and the mirror 22 (or the main body 21), as shown in FIG. 2B, for preventing light reflected from a surface of the transparency controllable film 13 caused by ambient light. The transparency controllable film 13 of the embodiment may be controlled by the controller 12 to change transparency of a local region of the transparency controllable film 13 or to display a predetermined image on the local region of the transparency controllable film 13. In one example, the transparency controllable film 13 may include a conventional liquid crystal display (LCD), such as a thin-film-transistor (TFT) LCD or an in-plane-switching (IPS) LCD, which may primarily include a liquid crystal layer and a pixel control layer (e.g., a TFT control layer) but no backlight layer. In a normal mode, light may pass the liquid crystal layer without being polarized by liquid crystals of the liquid crystal layer, and therefore the transparency controllable film 13 is transparent. In a control mode, however, light is polarized by the liquid crystals of the liquid crystal layer, and therefore the local region of the transparency controllable film 13 controlled by the pixel control layer has reduced transparency. In another example, the transparency controllable film 13 may include a conventional light-emitting diode (LED) display, such as an organic light-emitting diode (OLED) display, which may primarily include an LED layer and a pixel control layer (e.g., a TFT control layer) but no back cover. In a normal mode, the LED layer does not perform displaying, and therefore the transparency controllable film 13 is transparent. In a control mode, however, the LED layer performs displaying, and therefore the local region of the transparency controllable film 13 controlled by the pixel control layer has reduced transparency.

Figure 1B:
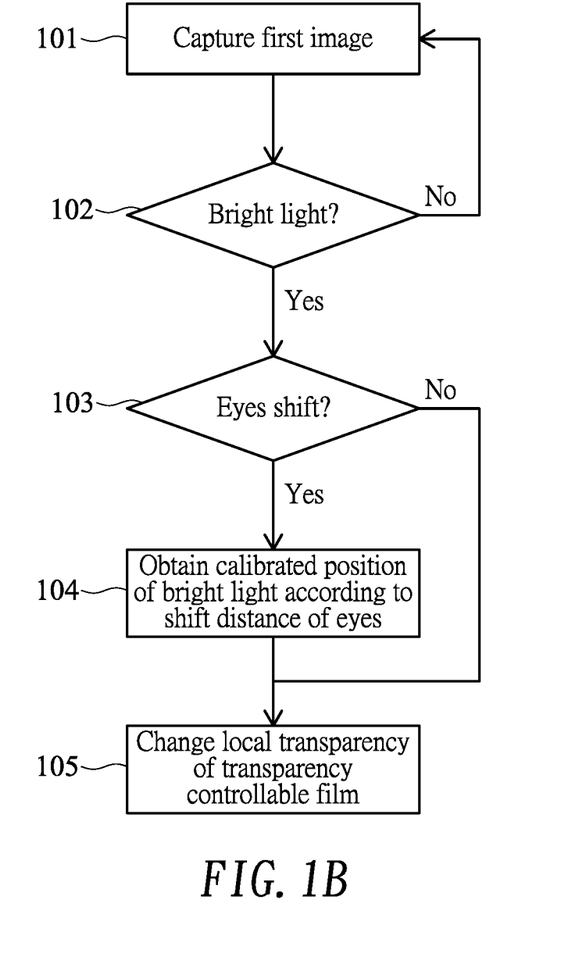
FIG. 1B shows a flow diagram associated with the display control system of FIG. 1A.

FIG. 1B shows a flow diagram associated with the display control system 100 of FIG. 1A. In step 101, the first image capture device 11 may capture a first image, which covers eyes of a driver and at least a portion of a rear windshield. The first image capture device 11 may perform image capturing periodically or in adjusted frequency according to weather, traffic or other conditions. In step 102, the controller 12 determines whether there is bright light on the first image, for example, caused by a lamp of a same-direction rear vehicle or rear sunlight. If the bright light is determined (e.g., a light source on the first image has brightness higher than a predetermined first threshold), the flow goes to step 103, in which the controller 12 determines (or tracks) whether eyes of the driver shift from an initial (or base) position. If it is determined that a shift distance of eyes of the driver between an eye position and the initial position is not zero, the flow goes to step 104, in which the controller 12 may calibrate an original position of the light source (i.e., the bright light) of the first image according to the shift distance and an initial coordinate system, thereby obtaining a calibrated position of the light source. In the specification, if the shift distance is small enough to be negligible, the shift distance may be considered to be zero. Finally, in step 105, the controller 12 may change (e.g., reduce) transparency of a local region of the transparency controllable film 13 corresponding to the calibrated position (from step 104) of the light source (if eyes shift) or the original position of the light source (if eyes do not shift). Accordingly, the embodiment can reduce glare of the rearview mirror 200 that may otherwise affect the driver.

Figure 3A:
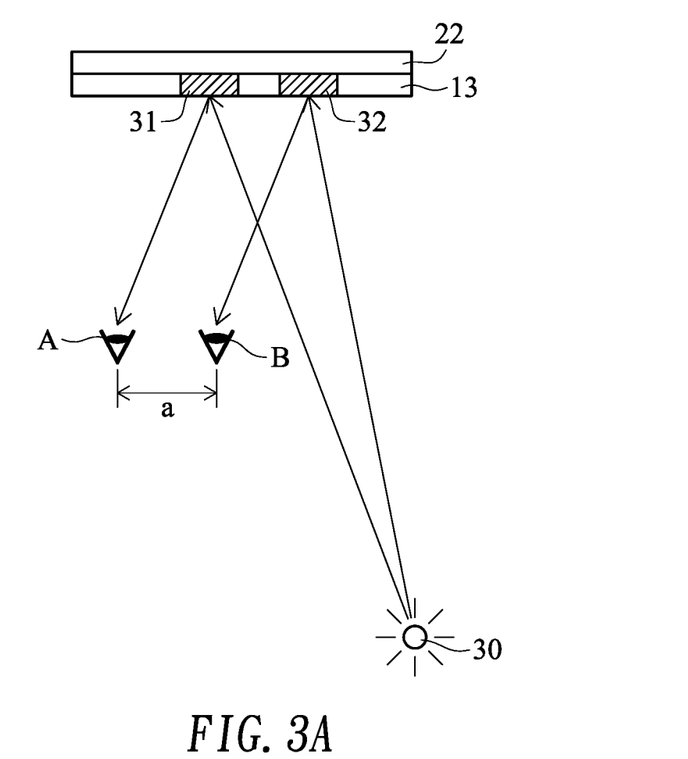
FIG. 3A shows a top view of the mirror and the transparency controllable film of the first embodiment.
Figure 3B:
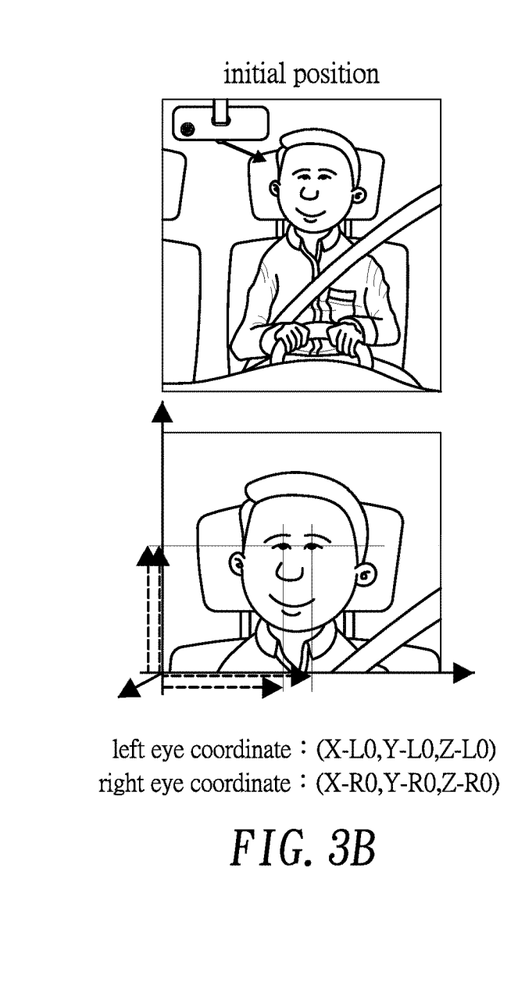
FIG. 3B to FIG. 3D show an example utilizing a three-dimensional coordinate system.
Figure 3C:
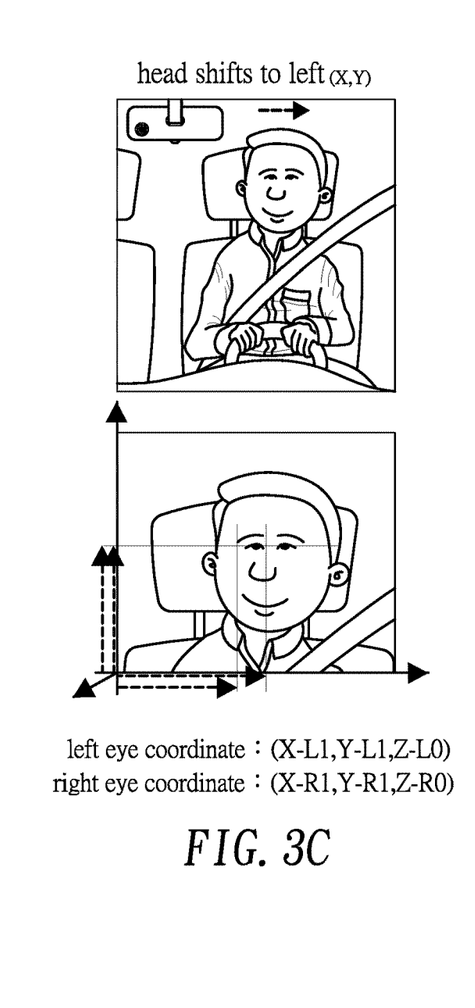
Figure 3D:
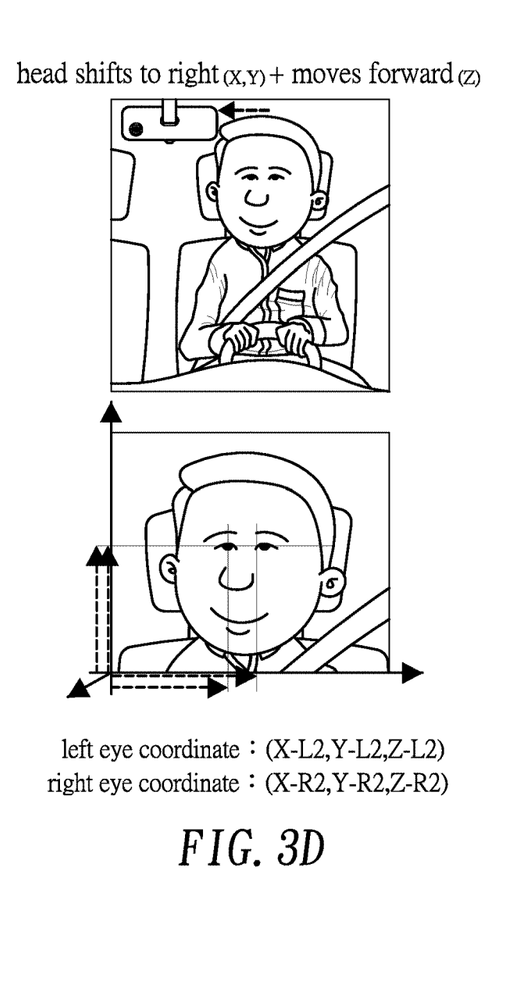

FIG. 3A shows a top view of the mirror 22 and the transparency controllable film 13 of the first embodiment illustrating a principle of the display control system 100 of the embodiment. Position A denotes an initial position of eyes (of a driver) in an initial (or base) coordinate system. In order to prevent eyes from being irradiated by a light source 30 via the mirror 22, transparency of a region 31 of the transparency controllable film 13 is reduced. However, as the driver's head shifts and driver's eyes shift to position B (with a shift distance of a), transparency reduction in the region 31 cannot prevent the light source 30 from affecting the driver. The original position 31 is calibrated according to the shift distance a and the initial (or base) coordinate system, thereby obtaining a calibrated position 32, according to which transparency of the region 32 of the transparency controllable film 13 is reduced instead, therefore effectively preventing glare caused by the light source 30 from affecting the driver. In another embodiment, the display control system 100 may include two of the first image capture devices 11 to capture a three-dimensional image, according to which depth information of eyes may be obtained and the eyes position can be precisely predicted. FIG. 3B to FIG. 3D show an example utilizing a three-dimensional coordinate system. FIG. 3B shows an initial position of a left eye coordinate and a right eye coordinate. FIG. 3C shows a left eye coordinate and a right eye coordinate after head shifts to left, in which Z coordinates do not change. FIG. 3D shows a left eye coordinate and a right eye coordinate after head shifts to right and moves forward, in which Z coordinates change and sizes of the head on the image change (e.g., enlarge).

Figure 4A:
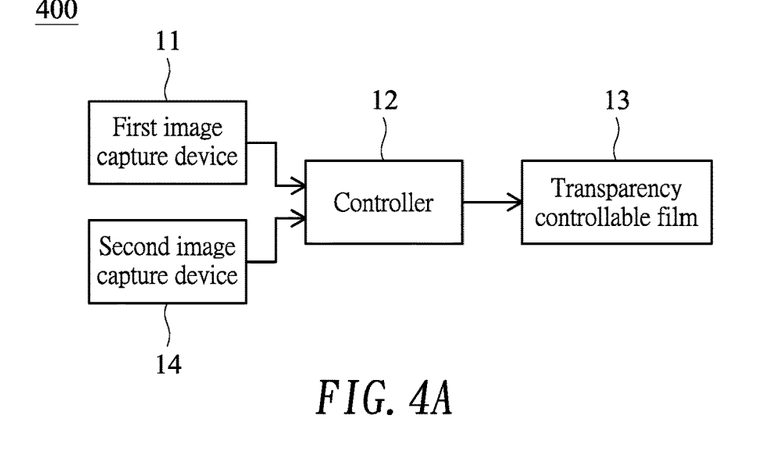
FIG. 4A shows a system block diagram illustrating an eye tracking-based display control system according to a second embodiment of the present disclosure.

FIG. 4A shows a system block diagram illustrating an eye tracking-based display control system 400 according to a second embodiment of the present disclosure. Some elements that are the same as in the first embodiment are omitted for brevity. The eye tracking-based display control system 400 ("display control system" hereinafter) of the embodiment may be disposed in a front of a vehicle (e.g., an automobile) to reduce bright light.

In the embodiment, the display control system 400 may include a first image capture device 11 configured to capture a first image. The display control system 400 may further include a second image capture device 14, such as a camera, that faces a second direction (being different from the first direction) to capture a second image. In the embodiment, the second image capture device 14 faces forward (e.g., toward a front windshield) to capture a front image. The second image capture device 14 of the embodiment may, but not limited to, be disposed on a side of the main body 21 against the mirror 22 (FIG. 2D).

The display control system 400 of the embodiment may include a controller 12 that is electrically connected to the first image capture device 11 and the second image capture device 14 to receive and process the first image captured by the first image capture device 11 and the second image captured by the second image capture device 14.

According to one aspect of the embodiment, the display control system 400 may include a transparency controllable film 13 that may be attached to an inner side of a front windshield or be disposed between the front windshield and a steering wheel. The sizes of the transparency controllable film 13 and the front windshield need not be the same, and they may be partially overlapped. The transparency controllable film 13 of the embodiment may be controlled by the controller 12 to change transparency of a local region of the transparency controllable film 13 or to display a predetermined image on the local region of the transparency controllable film 13. In one example, the transparency controllable film 13 may include a conventional liquid crystal display (LCD), such as a thin-film-transistor (TFT) LCD or an in-plane-switching (IPS) LCD. In another example, the transparency controllable film 13 may include a conventional light-emitting diode (LED) display, such as an organic light-emitting diode (OLED) display.

Figure 4B:
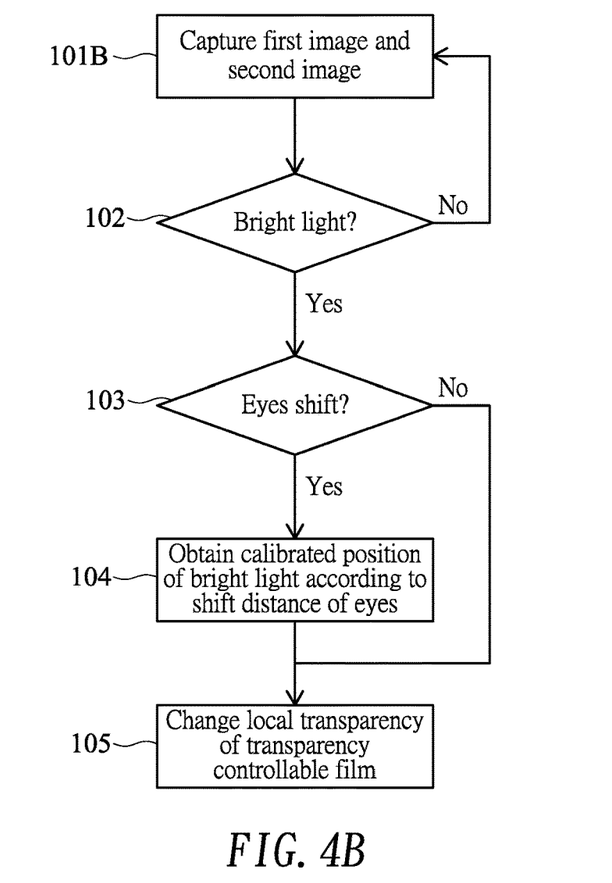
FIG. 4B shows a flow diagram associated with the display control system of FIG. 4A.

FIG. 4B shows a flow diagram associated with the display control system 400 of FIG. 4A. In step 101B, the first image capture device 11 may capture a first image, which covers eyes of a driver, and the second image capture device 14 may capture a second image, which covers at least a portion of a front windshield. The first image capture device 11 and the second image capture device 14 may perform image capturing periodically or in adjusted frequency according to weather, traffic or other conditions. In step 102, the controller 12 determines whether there is bright light on the second image, for example, caused by a lamp of an opposite-direction front vehicle or front sunlight. If the bright light is determined (e.g., a light source on the second image has brightness higher than a predetermined second threshold), the flow goes to step 103, in which the controller 12 determines (or tracks), according to the first image, whether eyes of the driver shift from an initial (or base) position. If it is determined that a shift distance of eyes of the driver between an eye position and the initial position is not zero, the flow goes to step 104, in which the controller 12 may calibrate an original position of the light source (i.e., the bright light) of the second image according to the shift distance and an initial coordinate system, thereby obtaining a calibrated position of the light source. Finally, in step 105, the controller 12 may change (e.g., reduce) transparency of a local region of the transparency controllable film 13 corresponding to the calibrated position (from step 104) of the light source (if eyes shift) or the original position of the light source (if eyes do not shift). Accordingly, the embodiment can reduce bright light that may otherwise affect the driver.

Figure 5A:
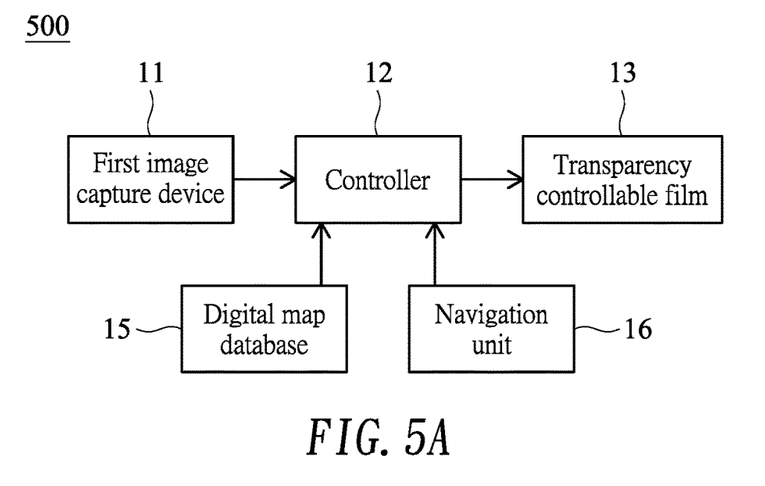
FIG. 5A shows a system block diagram illustrating an eye tracking-based display control system according to a third embodiment of the present disclosure.

FIG. 5A shows a system block diagram illustrating an eye tracking-based display control system 500 according to a third embodiment of the present disclosure. Some elements that are the same as in the first embodiment or the second embodiment are omitted for brevity. The eye tracking-based display control system 500 ("display control system" hereinafter) of the embodiment may be disposed in a front of a vehicle (e.g., an automobile) to act as a head-up display (HUD).

In the embodiment, the display control system 500 may include a first image capture device 11 configured to capture a first image. The display control system 500 of the embodiment may include a controller 12 that is electrically connected to the first image capture device 11 to receive and process the first image captured by the first image capture device 11.

According to one aspect of the embodiment, the display control system 500 may include a transparency controllable film 13 that may be attached to an inner side of a front windshield or be disposed between the front windshield and a steering wheel. The sizes of the transparency controllable film 13 and the front windshield need not be the same, and they may be partially overlapped. The transparency controllable film 13 of the embodiment may be controlled by the controller 12 to display a navigation image on the local region of the transparency controllable film 13 according to a digital map provided by a digital map database 15 and position information provided by a navigation unit 16 (e.g., global positioning system or GPS). In one example, the transparency controllable film 13 may include a conventional liquid crystal display (LCD), such as a thin-film-transistor (TFT) LCD or an in-plane-switching (IPS) LCD. In another example, the transparency controllable film 13 may include a conventional light-emitting diode (LED) display, such as an organic light-emitting diode (OLED) display.

Figure 5B:
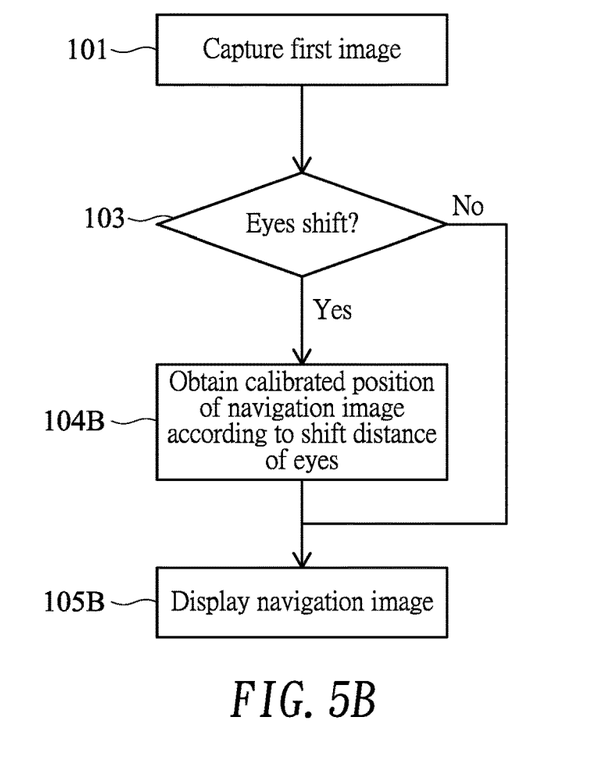
FIG. 5B shows a flow diagram associated with the display control system of FIG. 5A.
Figure 6A:
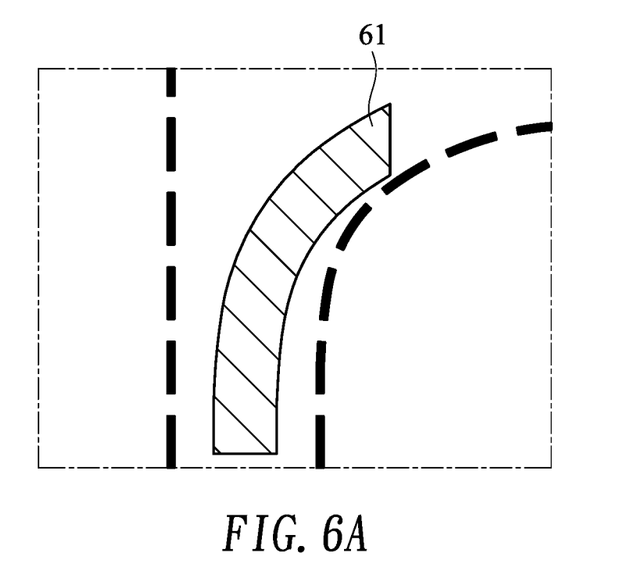
FIG. 6A and FIG. 6B schematically show a simplified head-up display.
Figure 6B:
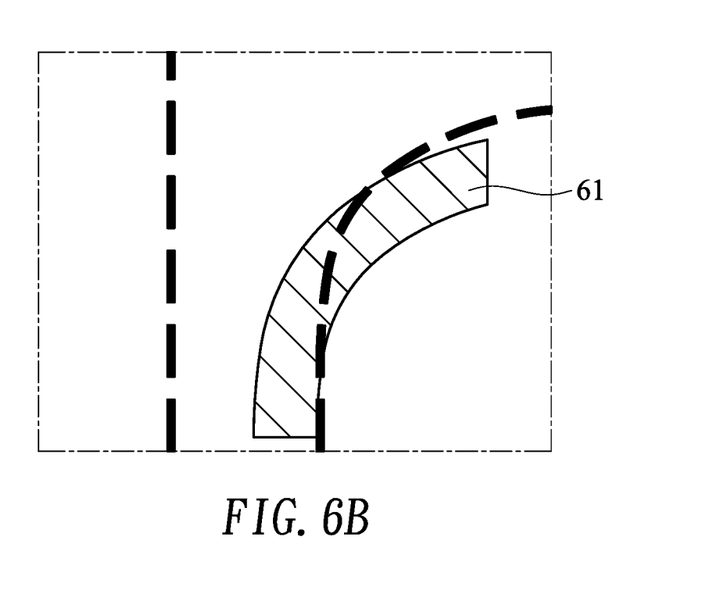

FIG. 5B shows a flow diagram associated with the display control system 500 of FIG. 5A. In step 101, the first image capture device 11 may capture a first image, which covers eyes of a driver. In step 103, the controller 12 determines (or tracks), according to the first image, whether eyes of the driver shift from an initial (or base) position. If it is determined that a shift distance of eyes of the driver between an eye position and the initial position is not zero, the flow goes to step 104B, in which the controller 12 may calibrate an original position of the navigation image according to the shift distance and an initial coordinate system, thereby obtaining a calibrated position of the navigation image. Finally, in step 105B, the controller 12 may display the navigation image on the transparency controllable film 13 corresponding to the calibrated position (from step 104) of the navigation image (if eyes shift) or the original position of the navigation image (if eyes do not shift). Accordingly, the embodiment can properly display the navigation image without being affected by navigation error caused by eyes shift of the driver. FIG. 6A schematically shows a simplified head-up display, in which a navigation block 61 navigates a driver to turn right along a turn lane (designated by dashed lines). However, the driver may perceive the navigation block 61 toward a wrong direction by offset or misaligned as shown in FIG. 6B, due to eyes shift caused by the head of driver moving. The embodiment can calibrate and align the position of the navigation block 61, thus properly navigating the driver.

Although specific embodiments have been illustrated and described, it will be appreciated by those skilled in the art that various modifications may be made without departing from the scope of the present disclosure, which is intended to be limited solely by the appended claims.

What is claimed is:

1. An eye tracking-based display control system, comprising:
    a main body defining a space to accommodate a mirror;
    a first image capture device disposed on the main body and facing a first direction to capture a first image;
    a controller electrically connected to the first image capture device to receive and process the first image; and
    a transparency controllable film disposed on an opposite side of the mirror against the main body;
    wherein in response to a determination that a light source on the first image has brightness higher than a predetermined first threshold, and a determination that a shift distance of eyes between an eye position and an initial position of a driver is not zero, the controller calibrates an original position of the light source according to the shift distance of the eyes and an initial coordinate system, thereby obtaining a calibrated position, according to which transparency of a local region of the transparency controllable film corresponding to the light source is changed;
    wherein when the controller determines that the light source on the first image has brightness higher than the predetermined first threshold but the shift distance of eyes of the driver is zero, the controller then changes transparency of a local region of the transparency controllable film corresponding to the original position of the light source.

2. The system of claim 1, wherein the first image includes an image of the eyes of the driver and at least a portion of a rear windshield.

3. The system of claim 1, wherein the first image capture device is disposed at a bottom of the main body.

4. The system of claim 1, wherein there is an angle between the transparency controllable film and the mirror.

5. The system of claim 1, wherein the transparency controllable film comprises a thin-film-transistor liquid crystal display, an in-plane-switching liquid crystal display or an organic light-emitting diode display.

6. An eye tracking-based display control system, comprising:
    a main body defining a space to accommodate a mirror;
    a first image capture device disposed on the main body and facing a first direction to capture a first image;
    a second image capture device disposed on the main body and facing a second direction to capture a second image, the second direction being different from the first direction;
    a controller electrically connected to the first image capture device and the second image capture device to respectively receive and process the first image and the second image; and
    a transparency controllable film attached to an inner side of a front windshield or disposed between the front windshield and a steering wheel;
    wherein when the controller determines that a light source on the second image has brightness higher than a predetermined second threshold, and the controller determines that a shift distance of eyes between an eye position and an initial position of a driver is not zero, the controller then calibrates an original position of the light source according to the shift distance of the eyes and an initial coordinate system, thereby obtaining a calibrated position, according to which transparency of a local region of the transparency controllable film corresponding to the light source is changed;
    wherein when the controller determines that the light source on the second image has brightness higher than the predetermined second threshold but the shift distance of eyes of the driver is zero, the controller then changes transparency of a local region of the transparency controllable film corresponding to the original position of the light source.

7. The system of claim 6, wherein the first image includes an image of the eyes of the driver and the second image includes an image of at least a portion of the front windshield.

8. The system of claim 6, wherein the first image capture device is disposed at a bottom of the main body, and the second image capture device is disposed on a side of the main body against the mirror.

9. The system of claim 6, wherein the transparency controllable film comprises a thin-film-transistor liquid crystal display, an in-plane-switching liquid crystal display or an organic light-emitting diode display.

* * * * *